March 5, 1963    O. R. BRINEY, JR., ET AL    3,079,815
BORING HEAD
Filed April 20, 1959            2 Sheets-Sheet 1
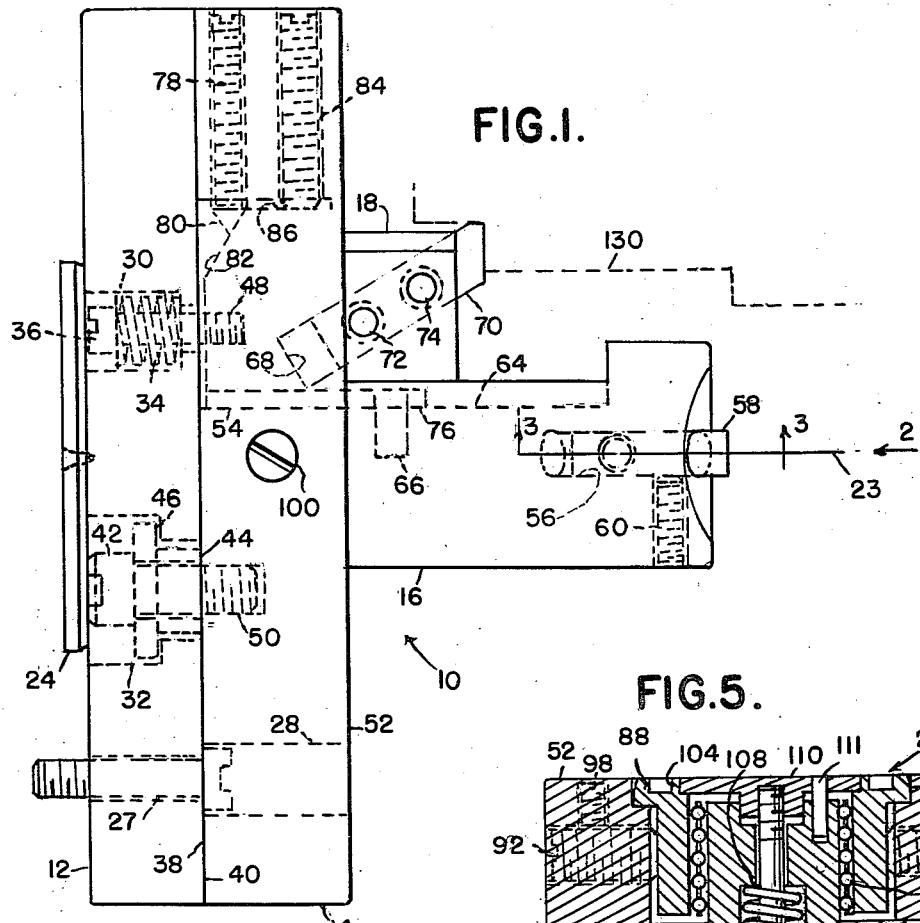
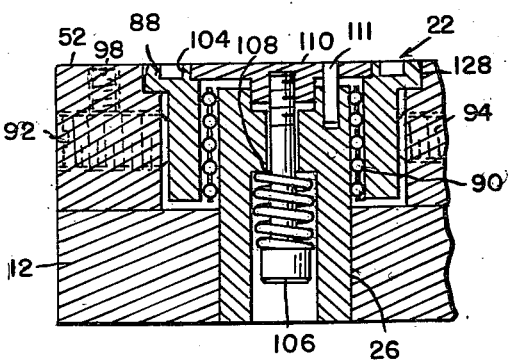
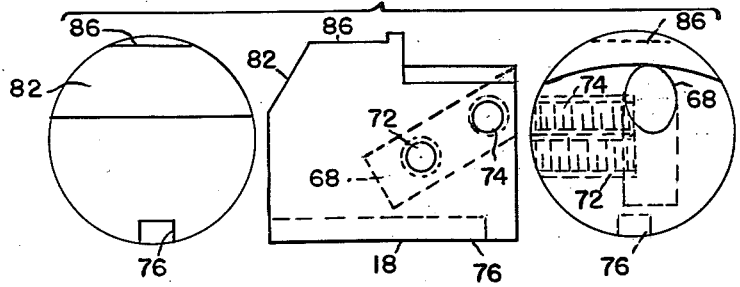
INVENTORS
OTTIS R. BRINEY, JR.
JAMES W. BRINEY
BY
ATTORNEY March 5, 1963   O. R. BRINEY, JR., ET AL   3,079,815
BORING HEAD
Filed April 20, 1959   2 Sheets-Sheet 2
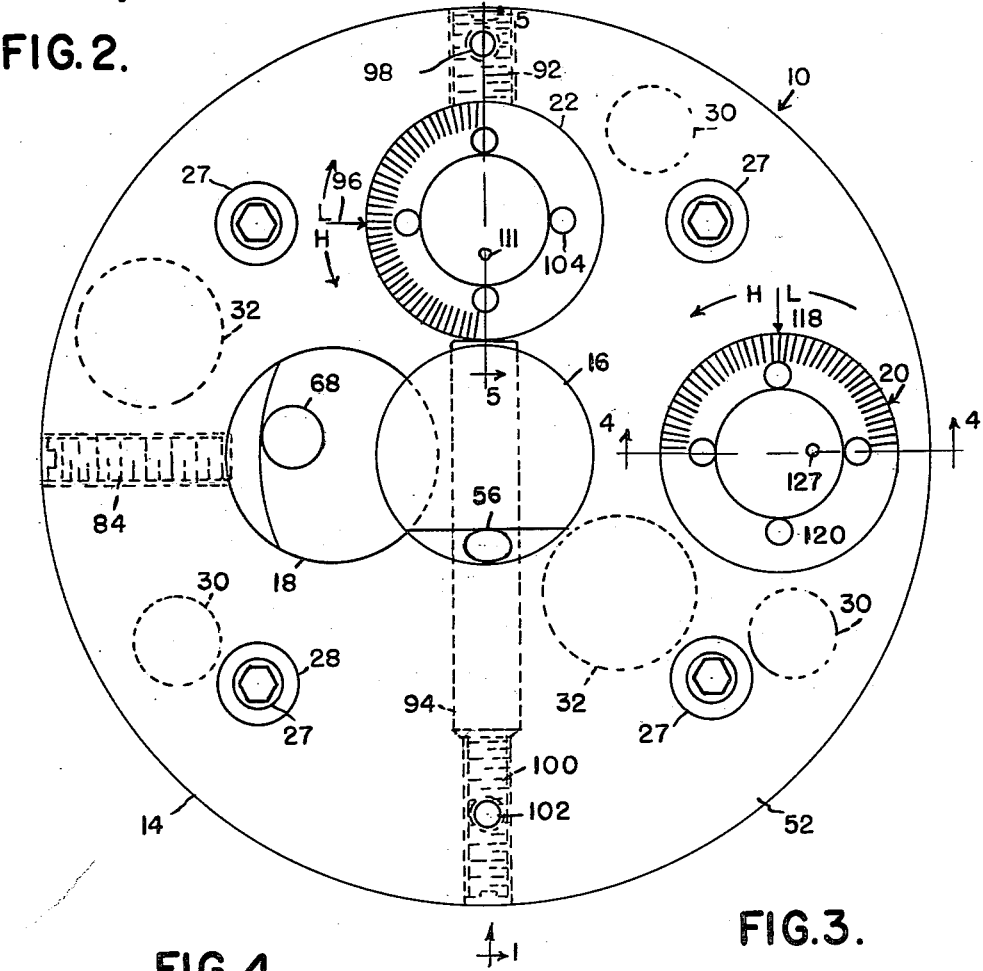
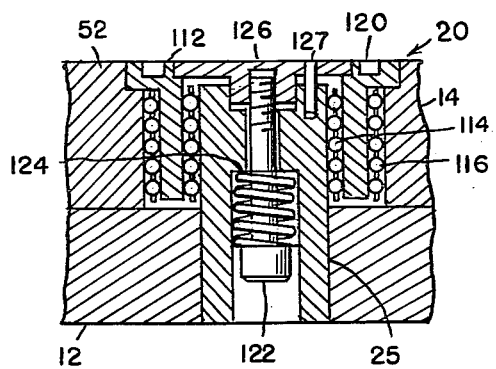
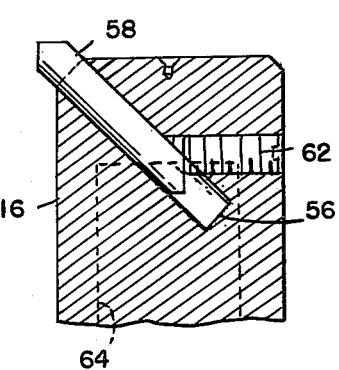
INVENTORS
OTTIS R. BRINEY, JR.
JAMES W. BRINEY
BY
ATTORNEYS United States Patent Office 3,079,815
Patented Mar. 5, 1963

3,079,815
BORING HEAD
Otis R. Briney, Jr., and James W. Briney, Pontiac, Mich., assignors to Briney Manufacturing Co., Pontiac, Mich., a corporation of Michigan
Filed Apr. 20, 1959, Ser. No. 807,588
16 Claims. (Cl. 77—58)

This invention relates to adjustable support structures and refers more specifically to a boring head including a pair of boring bars mounted thereon that hold cutting tools in substantially right angle relation to each other through the axis of rotation of the boring head and including means to substantially independently adjust the cutting tools radially with respect to the axis of rotation of the boring head.

In the performance of two simultaneous radial operations around a single axis of rotation it is often desirable to adjust the radius of only one operation with respect to the axis of rotation or to adjust the radius of both operations a different amount with respect to heir common axis. In the past, where such simultaneous operations were performed by members secured to a common support, in order to adjust the members radially it was necessary to individually loosen the connections of the members to the support, reposition the members and resecure the connections to the common support. Such operations were time consuming and the repositioning was difficult to perform with accuracy.

Therefore it is one of the objects of this invention to provide a pair of means mounted on a common support to perform two simultaneous radial operations about a single axis of rotation which means may be relatively independently adjusted radially with respect to the single axis of rotation without disturbing their connections to the common support.

Another object is to provide an adjustable support structure including a pair of means mounted on a common support which are relatively independently adjustable radially for performing radial operations about a common axis of rotation, said adjustment being capable of being accurately controlled.

Another object is to provide a rotatable boring head having mounted thereon a pair of boring bars carrying cutting tools in right angle relation to each other through the axis of rotation of the boring head and including means for substantially independently adjusting the cutting tools radially with respect to the axis of rotation of the boring head.

Another object is to provide a boring head comprising a rotatable base plate and a face plate adjustably secured to said base plate, the face plate having a pair of boring bars mounted thereon carrying cutting tools in right angle relation to each other through the axis of rotation of the boring head, the boring head also including eccentric sleeves operable between the base and face plates to adjust the face plate with respect to the base plate so that the cutting tools are substantially independenly adjusted radially with respect to the axis of rotation of the boring head.

Another object is to provide a rotatable boring head having mounted thereon a pair of boring bars carrying cutting tools in right angle relation to each other through the axis of rotation of the boring head including means for adjusting one of said boring bars axially with relation to the axis of rotation of the boring head and means for substantially independently adjusting the cutting tools radially with respect to said axis.

Another object is to provide a rotatable boring head having mounted thereon a pair of boring bars carrying cutting tools in right angle relation to each other through the axis of rotation of the boring head and including means for substantially independently adjusting the cutting tools radially with respect to the axis of rotation of the boring heads, wherein one of said boring bars is removable and adjustable with respect to said axis.

Another object is to provide an adjustable support structure which is simple in construction, easy to produce and efficient in use.

Other objects and features of the invention will become apparent as the description proceeds, especially when taken in conjunction with the accompanying drawings, illustrating a preferred embodiment of the invention, wherein:

FIGURE 1 is a side view of an adjustable support structure according to the invention taken in the direction of the arrow indicated 1 in FIGURE 2.

FIGURE 2 is a view of the end face of the support structure of FIGURE 1 taken in the direction of the arrow indicated 2 in FIGURE 1.

FIGURE 3 is a partial section of the support structure of FIGURE 1 taken on line 3—3 in FIGURE 1.

FIGURE 4 is a partial section of the support structure of FIGURE 1 taken along the line 4—4 in FIGURE 2.

FIGURE 5 is a partial section of the support structure of FIGURE 1 taken along the line 5—5 in FIGURE 2.

FIGURE 6 is an elevation and both end views of the adjustable and removable boring bar of the support structure of FIGURE 1.

The embodiment of the adjustable support structure illustrated in the figures is a boring head generally designated 10. As shown the boring head includes a base plate 12 for rigid attachment to the rotating spindle of a boring machine (not shown), a face plate 14 adjustably secured to the base plate 12 and having a boring bar 16 integral therewith, a boring bar 18 removably and adjustably attached to face plate 14 and a pair of eccentric adjusting means 20 and 22 operable between base plate 12 and face plate 14 to adjust the face plate relative to the base plate in a manner to substantially independently move the boring bars 16 and 18 radially with respect to the axis of rotation 23 of the boring head.

The base plate 12 of the boring head 10 is a circular metal disk. Base plate 12 includes a raised concentric central portion 24 on the boring machine side thereof as shown in FIGURE 1 to aid in positioning the boring head on the boring machine spindle. Base plate 12 also has cylindrical posts 25 and 26 as best shown in FIGURES 4 and 5 rigidly attached thereto as by a pressed fit. Posts 25 and 26 form part of the eccentric adjusting means 20 and 22 which function to adjust face plate 14 with respect to base plate 12 in a manner later described.

Bolts 27 are provided in conjunction with base plate 12 for securely fastening boring head 10 to the boring machine spindle. The number and location of bolts 27 is as shown in FIGURE 2. A typical bolt 27 is shown in position in boring head 10 in FIGURE 1. It will be noted in FIGURE 1 that clearance is provided between the head of bolt 27 and the sides of the opening 28 provided for it in face plate 14. This clearance prevents bolt 27 from interfering with the adjustment between the face and base plates to be explained later.

Base plate 12 is also provided with countersunk openings 30 and 32 therethrough positioned as indicated in FIGURE 2. Openings 30 are provided to allow the adjustable connection of base plate 12 to face plate 14 by means of springs 34 and headed screws 36 inserted therethrough. Screws 36 in connection with springs 34 resiliently hold base plate 12 and face plate 14 in contact along their abutting surfaces 38 and 40, respectively. The friction between surfaces 38 and 40 of the base and face plates resulting from the action of springs 34 in conjunction with screws 36 tends to resist relative movement between the face and base plates. Screws 36 may be adjusted to increase or decrease the ease of adjustment between the base and face plates.

Headed screws 42 and sleeves 44 in conjunction with washer 46 are provided in openings 32 as a safety measure to prevent excessive separation between the base plate 12 and the face plate 14 due to the possible compression of springs 34 on bolts 36. The length of sleeve 44 determines the clearance between washer 46 and base plate 12. The clearance between washer 46 and base plate 12 establishes the allowable separation between base plate 12 and face plate 14. It will be noted that openings 30 and 32 provide clearance around bolts 36 and 42, respectively, as in the case of bolts 27 and openings 28 so that adjustment of the face plate in the plane of surfaces 38 and 40 will not be restricted by the bolts.

Face plate 14 is also a circular metal disk similar to base plate 12 as shown in FIGURE 1. Unthreaded openings 28 and threaded openings 48 and 50 are provided in face plate 14 to receive previously described bolts 27, 36 and 42, respectively. Face plate 14 also has boring bar 16 integrally attached to face 52 thereof concentrically located with respect to the axis of rotation 23 of the tool holder 10. Plate 14 also has boring bar 18 removably and adjustably secured in opening 54 therein. Adjusting means 20 and 22 are also mounted in face plate 14 as shown in FIGURES 2, 4 and 5. Movement of face plate 14 with respect to base plate 12 with adjusting means 20 or 22 therefore causes boring bars 16 and 18 to move with respect to the axis of rotation 23 of boring head 10 in a manner later to be described.

Boring bar 16 as shown is integral with face plate 14 and is located concentrically thereon. Bar 16 is generally cylindrical in shape and is provided with a recess 56 at its outer end, positioned as shown best in FIGURE 3, in which a cutting tool 58 may be inserted. A set screw 60 and a positioning screw 62 are provided in conjunction with recess 56 to respectively secure and position cutting tool 58. Boring bar 16 is also provided with a recess 64 in one side thereof adapted to receive cylindrical boring bar 18. Pin 66 is inserted into member 16 as shown in recess 64 and serves as a guide and positioning member for boring bar 18.

Boring bar 18 shown in position on boring head 10 in FIGURES 1 and 2 and illustrated in detail in FIGURE 6 is also generally cylindrical with a recess 68 in the outer end thereof to receive cutting tool 70. Set screws 72 and 74 are provided to secure tool 70 in bar 18. A longitudinal slot 76 is provided in boring bar 18 which is engageable with pin 66 in recess 64 on boring bar 16 to align bar 18 with respect to member 16 as shown so that cutting tools 58 and 70 are substantially at right angles to each other through the axis of rotation 23 of the boring head 10.

As shown boring bar 18 is positioned within recess 54 in face plate 14. Bar 18 is both adjustable and removable. Adjusting screw 78 having tapered end 80 coacts with the beveled surface 82 on boring bar 18 to provide adjustment of bar 18 parallel to the axis of rotation 23 of tool holder 10. Set screw 84 acts in conjunction with flat surface 86 on boring bar 18 to secure bar 18 in a desired adjusted position.

With boring bar 18 being both adjustable and removable it is possible to remove tool 70 for sharpening and to reposition the tool exactly without difficulty. With such an arrangement it is also possible to provide interchangeable boring bars 18 so that when one is removed in order to replace or sharpen a tool a space bar 18 carrying a prepositioned tool 70 may be put into use immediately without the necessity of time consuming adjustments while the boring machine is idle.

Adjusting means 22 is positioned as best shown in FIGURE 2 on an extension of a line between the axis of rotation 23 of the boring head and the cutting tool 58. The adjusting means 22 includes post 26 rigidly secured to base plate 12, and eccentric sleeve 88 mounted on post 26 and operable in conjunction with bearing 90 and abutments 92 and 94 to move face plate 14 with respect to base plate 12. As indicated in FIGURE 2 the exposed surface of eccentric sleeve 22 is calibrated so that in conjunction with index arrow 96 the adjustment of adjusting means 22 may be regulated. A threaded abutment 92 as indicated extends through one edge of the face plate and may be locked in position by set screw 98. Abutment bar 94 extends through face plate 14 in line with abutment 92 and is held in place against eccentric sleeve 88 by adjusting screw 100 which, after use in the initial adjusting of the position of the face plate with respect to the base plate in conjunction with abutment 92, is locked in place by set screw 102.

Recesses 104 are also provided in the exposed face of eccentric sleeve 88 so that sleeve 88 may be rotated with an appropriate tool. Headed screw 106, spring 108, and cap 110 which bears on eccentric sleeve 88 when screw 106 is tightened are provided to adjust the frictional resistance which sleeve 88 offers to a rotating force applied thereto. This frictional force must be sufficient to prevent sleeve 88 from being rotated accidentally. Pin 111 is provided between cap 110 and post 26 to prevent cap 110 from rotating with sleeve 88.

In operation eccentric sleeve 88 when rotated causes the face plate to pivot about an axis through adjusting means 20. Such action causes cutting tool 58 to move on an arcuate line which is substantially radial with respect to the axis of rotation 23 of the tool holder 10 for relatively small adjustments. The same rotation of sleeve 88 causes cutting tool 70 to move in an arcuate path which is substantially circumferential with respect to axis 23 for relatively small adjustments. Thus it can be seen that cutting tool 58 may be moved radially with respect to axis 23 substantially independently of cutting tool 70 by rotation of eccentric sleeve 88. Furthermore this adjustment is calibrated and may be easily controlled while the boring head 10 is in place.

In considering the indicated movement of cutting tools 58 and 70 on rotation of sleeve 88 it will be remembered that during rotation of the tool holder 10 that tools 58 and 70 rotate in a circular path about axis 23. Therefore as face plate 14 moves angularly about pin 26 on rotation of eccentric sleeve 88 due to contact of sleeve 88 with abutments 92 and 94, cutting tool 58 will move in an arcuate path which will be substantially radial with respect to the axis 23 and the circular path the tool 58 follows on rotation of the tool holder 10. At the same time the cutting tool 70 will move in a path substantially circumferentially with respect to the axis 23 and the circular path tool 70 follows on rotation of the tool holder 10. Thus during movement of sleeve 88 the tool 58 is caused to be moved radially with respect to its previous circular path while tool 70 remains at substantially the same radius with respect to its previous circular path. Tool 58 may therefore be adjusted radially with respect to the axis of rotation 23 substantially independently of radial adjustment of tool 70.

Adjusting means 20 is positioned as shown in FIGURE 2 and is similar in construction and operation to adjusting means 22. Adjusting means 20 includes post 25 rigidly attached to base plate 12 and eccentric sleeve 112 mounted on post 25 and operable in conjunction with bearings 114 and 116 to move face plate 14 with respect to base plate 12. The outer surface of sleeve 112 also contains calibrations as shown which in conjunction with arrow 118 indicate the amount of rotation of sleeve 112. Recesses 120 are also provided in the outer surface of sleeve 112 to permit rotation of the sleeve with the proper tool. As in adjusting means 22, adjusting means 20 is provided with headed screw 122, spring 124 and cap 126 to regulate the frictional resistance of sleeve 112 to rotation thereof. Pin 127 is provided to prevent cap 126 from rotating with sleeve 112.

Adjusting means 20 operates in a manner similar to adjusting means 22. On rotation of eccentric sleeve 112 face plate 14 rotates about an axis through adjusting means 22 thereby moving cutting tool 70 in an arcuate path substantially radially with respect to the axis of rotation 23 of boring head 10 and moving cutting tool 58 on an arcuate path substantially circumferentially with respect to axis 23. Thus it may be seen that either cutting tool 58 or 70 may be adjusted radially of the axis 23 substantially independently of the other cutting tool.

The difference in structure between adjusting means 20 and 22 is necessary to prevent binding of the adjusting means on rotation of the eccentric sleeves. Due to a small clearance indicated at 128 between the top of eccentric sleeve 88 and the face plate 14 the face plate is allowed to move to relieve any binding pressure developed between the adjusting means 20 and 22 on rotation of either eccentric sleeve. This movement is restricted to a movement at right angles to the axis of abutments 92 and 94 by providing abutments 92 and 94 in adjusting means 22 instead of the outer bearings 116 as in adjusting means 20.

In operation, when it is desired to bore two concentric recesses in a workpiece 130 the boring head 10 carrying boring bars 16 and 18 with tools 58 and 70 respectively secured thereto is mounted on a boring machine spindle to rotate about axis 23 by means of bolts 27. Bolts 36 hold face plate 14 in contact with base plate 12. The bolts 42 prevent excessive separation of the two plates. The boring head 10 is then advanced toward workpiece 130 thereby placing tools 58 and 70 in contact with the workpiece and the desired concentric recesses are formed.

During this operation the relative depth of the recesses formed and their initial radius may be determined by the axial positioning of boring bar 18, the setting of abutments 92 and 94, and the relative positions of tools 58 and 70 in boring bars 16 and 18. Should tool 70 become dull or broken, boring bar 18 may be removed from the tool holder and replaced with a spare boring bar 18 carrying a different tool with a minimum of lost machine time by merely loosening screw 84.

If it is desired to independently change the radius of the recess produced by cutting tool 70 this may be accomplished by rotating eccentric sleeve 112 with a proper tool inserted in recesses 120. As previously explained such rotation will cause face plate 14 to pivot about adjusting means 22 moving cutting tool 70 substantially radially with respect to the axis of rotation 23 of the tool holder 10 while cutting tool 58 moves substantially circumferentially with respect to axis 23. The face plate 14 will move slightly at right angles to abutments 92 and 94 during the turning of sleeve 112 to prevent binding thereof as disclosed above. The radius produced by cutting tool 58 may also be independently adjusted in a similar manner by rotation of eccentric sleeve 88 as previously described.

The drawings and the foregoing specification constitute a description of the improved boring head in such full, clear, concise and exact terms as to enable any person skilled in the art to practice the invention, the scope of which is indicated by the appended claims.

What we claim as our invention is:

1. A support structure comprising an adjustable plate, a pair of cutting tools secured to said plate against relative movement, and means operably associated with said plate for adjusting said plate, simultaneously moving said cutting tools and selectively producing movement having a primarily radial component of only one of said cutting tools with respect to an axis of rotation perpendicular to said plates while maintaining the cutting tools in fixed relation to each other.

2. An adjustable support structure comprising a base plate, a face plate slidably attached to said base plate, a pair of cutting tools secured to said face plate against relative movement, and means operably associated with said base and face plates for adjusting said face plate relative to said base plate, simultaneously moving said cutting tools and selectively producing movement having a primarily radial component of only one of said cutting tools with respect to an axis of rotation perpendicular to said plates while maintaining the cutting tools in fixed relation to each other.

3. An adjustable support structure comprising a base plate, a face plate slidably attached to said base plate, a pair of boring bars secured to said face plate against relative movement, a cutting tool inserted in each boring bar and means operably associated with said base and face plates to selectively radially move one of said cutting tools a distance large in comparison to a simultaneous radial movement of the other of the cutting tools with respect to an axis of rotation perpendicular to said plates by relatively moving the base and face plates while maintaining the cutting tools in fixed relation to each other.

4. An adustable support structure comprising a base plate, a face plate slidably attached to said base plate, a pair of boring bars secured to said face plate against relative movement, a cutting tool inserted in each boring bar and means operably associated with said base and face plates for simultaneously moving said cutting tools and selectively producing movement having a primarily radial component of only one of said cutting tools with respect to an axis of rotation perpendicular to said plates by relatively moving the base and face plates while maintaining the cutting tools in fixed relation to each other.

5. An adjustable support structure comprising a rotatable base plate, a face plate slidably attached to said base plate for rotation therewith, a pair of boring bars secured to said face plate against relative movement, a cutting tool inserted in each said boring bar and means operably associated with said base and face plates for simultaneously moving said cutting tools and selectively producing movement having a primarily radial component of only one of said cutting tools with respect to the axis of rotation of said base plate by relatively moving the base and face plates while maintaining the cutting tools in fixed relation to each other.

6. An adjustable support structure comprising a base plate, a face plate slidably attached to said base plate, a pair of boring bars extending perpendicularly to and secured to said face plate against relative movement, a cutting tool inserted in each said boring bar, the tools having cutting edges in substantially right angle relationship with respect to an axis of rotation perpendicular to said plates, a pair of posts extending from said base plate, a pair of eccentric sleeve adjusting means set in said face plate and rotatably mounted on said posts, one of said eccentric sleeves being in line through said axis of rotation with the cutting edge of a first of said tools, the other of said eccentric sleeves being in line through said axis of rotation with the cutting edge of the second of said tools, said one eccentric sleeve operable on rotation to pivot said face plate with respect to said base plate about an axis through the other eccentric sleeve thereby moving the cutting edge of the first of said tools substantially radially and the cutting edge of the second of said tools substantially circumferentially about said perpendicular axis, said other eccentric sleeve operable on rotation to pivot said face plate with respect to said base plate about an axis through said one eccentric sleeve thereby moving the cutting edge of the second of said tools substantially radially and the cutting edge of the first of said tools substantially circumferentially about said perpendicular axis.

7. An adjustable support structure comprising a base plate, a face plate slidably attached to said base plate, a pair of boring bars secured to said face plate against relative movement, a cutting tool inserted in each said boring bar, the tools having their cutting edges in substantially right angle relationship with respect to an axis of rotation perpendicular to said plates, and means operably associated with said base and face plates for simultaneously moving said cutting tools and selectively producing movement having a primarily radial component of the cutting edge of only one of said cutting tools with respect to said axis of rotation by relatively moving the base and face plates while maintaining the cutting tools in fixed relation to each other.

8. An adjustable support structure comprising a base plate, a face plate slidably attached to said base plate, a pair of boring bars secured to said face plate against relative movement, a cutting tool inserted in each said boring bar, the tools having their cutting edges in substantially right angle relationship with each other with respect to an axis of rotation perpendicular to said plates, and means operably associated with said face plates for simultaneously moving said cutting tools and selectively producing movement having a primarily radial component of the cutting edge of only one of said cutting tools with respect to said axis of rotation by relatively moving the base and face plates while maintaining the cutting tools in fixed relation to each other, including a pair of posts rigidly secured to said base plate, a pair of eccentric sleeves set in said face plate and mounted for rotation on said posts, and bearings operably associated with one of said pair of eccentric sleeves between the sleeve and the face plate and between the sleeve and its associated post.

9. An adjustable support structure comprising a base plate, a face plate slidably attached to said base plate, a pair of boring bars secured to said face plate against relative movement, a cutting tool inserted in each said boring bar, the tools having their cutting edges in substantially right angle relationship with each other with respect to an axis of rotation perpendicular to said plates, and means operably associated with said face plates for simultaneously moving said cutting tools and selectively producing movement having a primarily radial component of the cutting edge of only one of said cutting tools with respect to said axis of rotation by relatively moving the base and face plates while maintaining the cutting tools in fixed relation to each other, including a pair of posts rigidly secured to said base plate, a pair of eccentric sleeves set in said face plate and mounted for rotation on said posts, bearings operably associated with one of said pair of eccentric sleeves acting between said one sleeve and its associated post, and a pair of adjustable abutments mounted in said face plate in contact with the outer surface of said one sleeve.

10. An adjustable support structure comprising a base plate, a face plate slidably attached to said base plate, a pair of boring bars secured to said face plate against relative movement, a cutting tool inserted in each said boring bar, the tools having their cutting edges in substantially right angle relationship with each other with reference to an axis of rotation perpendicular to said plates, and means operably associated with said face plates for simultaneously moving said cutting tools and selectively producing movement having a primarily radial component of the cutting edge of only one of said cutting tools with respect to said axis of rotation by relatively moving the base and face plates while maintaining the cutting tools in fixed relation to each other, including a pair of posts rigidly secured to said base plate, a pair of eccentric sleeves set in said face plate and mounted for rotation on said posts, bearings operably associated with one of said pair of eccentric sleeves between the sleeve and th face plate and between the sleeve and its associated post, bearings operably associated with the other of said pair of eccentric sleeves acting between the other sleeve and its associated post and a pair of adjustable abutments secured in said face plate in contact with the outer surface of said other sleeve, said one of said eccentric sleeves being substantially in line through said axis of rotation with the cutting edge of one of said cutting tools, said other of said eccentric sleeves being substantially in line through the axis of rotation with the cutting edge of the other of said cutting tools.

11. An adjustable support structure comprising a base plate, a face plate slidably attached to said base plate, a pair of boring bars secured to said face plate against relative movement, one of said boring bars being removable, a cutting tool inserted in each said boring bars, the tools having their cutting edges in substantially right angle relationship with each other with respect to an axis of rotation perpendicular to said plates, and means operably associated with said base and face plates for simultaneously moving said cutting tools and selectively producing movement having a primarily radial component of the cutting edge of only one of said cutting tools with respect to said axis of rotation by relatively moving the base and face plates while maintaining the cutting tools in fixed relation to each other.

12. An adjustable support structure comprising a base plate, a face plate slidably attached to said base plate, a pair of boring bars secured to said face plate against relative movement, a cutting tool inserted in each said boring bar, the tools having their cutting edges in substantially right angle relationship with each other with respect to an axis of rotation perpendicular to said plates, one of said boring bars being removable, said removable boring bar being adjustable axially of said axis of rotation, and means operably associated with said base and face plates for simultaneously moving said cutting tools and selectively producing movement having a primarily radial component of the cutting edge of only one of said cutting tools with respect to said axis of rotation by relatively moving the base and face plates while maintaining the cutting tools in fixed relation to each other.

13. An adjustable support structure comprising a base plate, means associated with said base plate to fixedly attach it to a rigid object, a face plate in slidable contact with said base plate, means movably attaching said face plate to said base plate, means acting between said base plate and said face plate to limit separation thereof, a boring bar integral with said face plate, a second boring bar removably mounted on said face plate, a cutting tool inserted in each said boring bar, the tools having their cutting edges in right angle relationship with each other with respect to an axis of rotation perpendicular to said face and base plates, said second boring bar being adjustable axially with respect to said perpendicular axis, and a pair of eccentric sleeves operable between said base and face plates for simultaneously moving said cutting tools and selectively producing movement having a primarily radial component of the cutting edge of only one of said cutting tools with respect to said perpendicular axis by relatively moving the base and face plates while maintaining the cutting tools in fixed relation to each other, one of said eccentric sleeves being substantially in line through said axis with the cutting edge of one of said tools, the other of said eccentric sleeves being substantially in line through said axis with the cutting edges of the other of said tools.

14. An adjustable support structure comprising a base plate, a face plate attached to said base plate for pivotal sliding movement relative thereto, a pair of boring bars secured to said face plate, a cutting tool carried by each of said boring bars, the cutting edges of the cutting tools being in substantially right angle relation with respect to an axis perpendicular to said plates, a pivot connection between said base and face plates, said pivot connection being susbtantially in line with said axis and the cutting edge of one of the tools and spaced from said axis, means operable between the base and face plates for pivoting said face plate relative to said base plate about said pivot connection, a second pivot connection between said base and face plates, said second pivot connection being substantially in line with the axis and the cutting edge of the other of the tools and spaced from said axis, and means operable between the base and face plates for pivoting said face plate relative to said base plate about said second pivot connection.

15. Structure as claimed in claim 14 wherein the first mentioned pivot connection and the means for pivoting the face plate about the second pivot connection are integral.

16. Structure as claimed in claim 15 wherein said second pivot connection and the means for pivoting the face plate about the first mentioned pivot connection are integral.

References Cited in the file of this patent

UNITED STATES PATENTS

| | | |
|---|---|---|
| 2,368,846 | Klomp | Feb. 6, 1945 |
| 2,558,815 | Briney | July 3, 1951 |
| 2,590,068 | Pekrul | Mar. 18, 1952 |
| 2,867,031 | Briney | Jan. 6, 1959 |
| 2,883,897 | Allemann | Apr. 28, 1959 |

FOREIGN PATENTS

| | | |
|---|---|---|
| 43,802 | Switzerland | Mar. 23, 1908 |
| 191,623 | Great Britain | Jan. 18, 1923 |
| 880,087 | Germany | July 18, 1953 |